United States Patent
Lester et al.

(10) Patent No.: US 9,369,223 B2
(45) Date of Patent: Jun. 14, 2016

(54) CONTENT BROADCAST

(75) Inventors: Donald Lester, Stevenage (GB); Kevin Hodson, Stevenage (GB)

(73) Assignee: ASTRIUM LIMITED, Hertfordshire (GB)

( * ) Notice: Subject to any disclaimer, the term of this patent is extended or adjusted under 35 U.S.C. 154(b) by 225 days.

(21) Appl. No.: 13/321,721

(22) PCT Filed: May 20, 2010

(86) PCT No.: PCT/EP2010/056957
§ 371 (c)(1),
(2), (4) Date: Feb. 7, 2012

(87) PCT Pub. No.: WO2010/133664
PCT Pub. Date: Nov. 25, 2010

(65) Prior Publication Data
US 2012/0131618 A1    May 24, 2012

(30) Foreign Application Priority Data
May 20, 2009    (EP) ...................................... 09275037

(51) Int. Cl.
*H04N 21/235* (2011.01)
*H04H 40/90* (2008.01)
*H04H 20/74* (2008.01)

(52) U.S. Cl.
CPC ............... *H04H 40/90* (2013.01); *H04H 20/74* (2013.01); *Y02B 60/50* (2013.01)

(58) Field of Classification Search
USPC ........................................ 455/3.02, 12.1, 430
See application file for complete search history.

(56) References Cited

U.S. PATENT DOCUMENTS

| 5,752,187 | A | 5/1998 | Frank et al. | |
|---|---|---|---|---|
| 2004/0087330 | A1* | 5/2004 | Petri | H04B 7/18567 455/522 |
| 2008/0268836 | A1* | 10/2008 | Karabinis | H04B 7/18513 455/427 |
| 2008/0268838 | A1* | 10/2008 | Zufall et al. | 455/430 |

(Continued)

FOREIGN PATENT DOCUMENTS

| JP | H07-321721 A | 8/1995 |
|---|---|---|
| WO | 98/14026 A1 | 4/1998 |
| WO | WO 2008/115949 A2 | 9/2008 |

OTHER PUBLICATIONS

*International Search Report (PCT/ISA/210) mailed on Jul. 12, 2010, by the European Patent Office as the International Searching Authority for International Application No. PCT/EP2010/056957.

(Continued)

*Primary Examiner* — Jefferey Harold
*Assistant Examiner* — Sihar Karwan
(74) *Attorney, Agent, or Firm* — Buchanan Ingersoll & Rooney PC

(57) ABSTRACT

A receiving device for receiving a satellite broadcast is disclosed which includes a receiver for receiving a sustaining satellite beam and a controller for switching the receiver to receive a high power content beam in response to a determination that the high power content beam can be received by the receiving device. A communication satellite can transmit the high power content beam to different geographical areas at different times. The sustaining beam allows the receiving device to remain synchronized with the communication satellite when the high power content beam is directed elsewhere. The sustaining beam may be a lower power beam. The determination that the high power content beam can be received may be performed based on information in the sustaining beam.

15 Claims, 4 Drawing Sheets

(56) References Cited

U.S. PATENT DOCUMENTS

2008/0311844 A1* 12/2008 Eidenschink ........ H04B 7/2041
455/3.02

OTHER PUBLICATIONS

*Written Opinion (PCT/ISA/237) mailed on Jul. 12, 2010, by European Patent Office as the International Searching Authority for International Application No. PCT/EP2010/056957.

*European Patent Office Search Report for EP 09 27 5037, mailed Feb. 26, 3020.
Japanese Office Action (Notice of Reasons for Rejection) dated Feb. 17, 2014, issued in corresponding Japanese Application No. 2012-511288. (5 pgs).
English language version of Office Action dated Mar. 21, 2014, issued by the Russian Patent Office in the corresponding Russian Patent Application No. 2011151827. (5 pages).

* cited by examiner

CONTENT BROADCAST

FIELD OF THE INVENTION

The invention relates to satellite broadcasts using a time divided high power content beam.

BACKGROUND OF THE INVENTION

It is often desirable to use satellites to broadcast content, not least in areas where it is not commercially viable to use terrestrial transmitters.

Broadcasting content over a large area using a satellite requires a large amount of power. Current technology generally limits the amount of power continuously available on a satellite to less than about 20 kW. A satellite broadcast service, such as a digital television service, over an area the size of North America or sub-Saharan Africa, provided with current techniques is likely to result in a satellite requiring a continuous power of about 100 kW. A single satellite would therefore have insufficient power to provide a continuous service over a large continental area. For this and other reasons, it is desirable to provide a time divided broadcast signal. The satellite may direct a beam including the content at different geographical areas at different times. User devices on ground can receive the content in bursts and can display the content directly or store the content for later display. The user devices can be arranged to power up, in accordance with a schedule, and synchronise with the satellite in time to receive the content beam. However, it is sometimes desirable to cycle the transmissions rapidly and even to vary the content density between the different cells. The time it takes to power up and synchronise a user device puts constraints on the speed at which the transmissions can be cycled and the flexibility of varying the content density between the cells.

The invention was made in this context.

SUMMARY OF THE INVENTION

According to the invention, there is provided a receiving device for receiving a satellite broadcast comprising: a receiver for receiving a sustaining satellite beam; and a controller for switching the receiver to receive a high power content satellite beam in response to a determination that the high power content satellite beam can be received by the receiving device.

The high power content satellite beam may provide content to different geographical areas at different times. The sustaining beam may be a wide beam covering all said different geographical areas. The sustaining beam allows the receiving device to remain synchronised when the high power content beam is directed elsewhere.

The controller may be configured to determine the presence of the high power content satellite beam based on information in the sustaining satellite beam. The information may be an indication of when the high power content beam will be moved to a region in which the receiving device is located. The controller may instruct the receiver to tune to a frequency associated with the high power content beam at a time indicated by information in the sustaining beam and lock to the frequency if a signal at the frequency is found. The controller may instruct the receiver to tune to the frequency associated with the high power content beam in accordance with the signal structure of the sustaining beam.

The controller may be configured to perform a search for the high power content beam and determine the presence of the high power content beam based on a determination that the signal strength associated with the high power content beam is higher than a threshold. The threshold may be the signal strength of the sustaining beam. The controller may be configured to search the high power content beam and monitor the signal strength in response to signalling in the sustaining beam. The controller may be configured to search for the high power content beam in accordance with the signal structure of the sustaining beam.

For example, the sustaining beam may comprise packets of data and the controller may be configured to search for and tune to the high power content beam in between reception of relevant packets.

The controller may further be configured to switch the receiver back to receiving the sustaining satellite beam in response to a determination that the high power content beam cannot be received. The controller may determine that the transmission of the high power content beam is being interrupted based on content in the high power content beam, based on the signal strength of the high power content beam or based on both content and the signal strength of the high power content beam.

The sustaining satellite beam and the high power content beam may be received in different frequency bands. The sustaining beam may be a narrowband beam. The transmission power of the sustaining beam may be lower than the transmission power of the high power content beam.

The high power content beam may provide television content.

The receiving device may operate according to the ETSI, DVB-H, DVB-SH A, DVB-SH B or other standards.

The controller may be configured to perform a handover to the sustaining beam according to the DVB-H, DVB-SH A, DVB-SH B, ETSI or other standard in order to switch the receiver to receive the high power content satellite beam.

According to the invention, there is also provided a set-top box for a television receiver comprising the receiving device of any one of the preceding claims.

The high power content beam may comprise a plurality of time-division multiplexed television channels and the set-top box may further comprise a memory for storing the received content in the television channels for time-shifted display to a user.

The sustaining beam may also comprises a plurality of time-division multiplexed television channels corresponding to the television channels of the high-power content beam but with reduced content. The sustaining beam may comprise a 24 hour television news channel. Alternatively, the sustaining beam may be a signalling channel.

Furthermore, according to the invention, there is also provided a communication satellite comprising: transmission means for providing a sustaining beam covering a first geographical area and a high power content beam covering a second geographical area, and means for moving the high power content beam from said second geographical area to a third geographical area in accordance with a broadcast schedule, the third geographical area being different to the second geographical area and forming a portion of the first geographical area and the sustaining beam being provided to allow a receiver in the third geographical area to be synchronised with the communication satellite when the high power content beam is directed towards the second geographical area.

The sustaining beam and the high power content beam may be arranged to allow the receiver to perform a handover between the sustaining beam and the high power content beam according to the ETSI, DVB-H or DVB-SH A or DVB- SH B standard. The sustaining beam may comprise instructions to perform the handover.

Yet further, according to the invention, there is provided a broadcast system comprising the communication satellite and at least one receiving device or set-top box as described above.

Additionally, according to the invention, there is provided a method of receiving a satellite broadcast comprising receiving a sustaining beam; performing a handover to a high power content beam from the sustaining beam in response to a determination of the presence of a high power content beam.

The method may further comprise, in response to determining that the high power content beam is interrupted, resuming reception of the sustaining beam.

The method may further comprise determining the presence of the high power content beam based on an indication in the sustaining beam or based on the signal strength of a signal at a frequency associated with the high power content beam.

Performing the handover may comprise performing a handover according to the DVB-H, DVB-SH A, DVB-SH B or ETSI standard.

BRIEF DESCRIPTION OF THE DRAWINGS

Embodiments of the invention will now be described, by way of example, with reference to FIGS. 1 to 7 of the accompanying drawings, in which.

DETAILED DESCRIPTION

Figure 1:
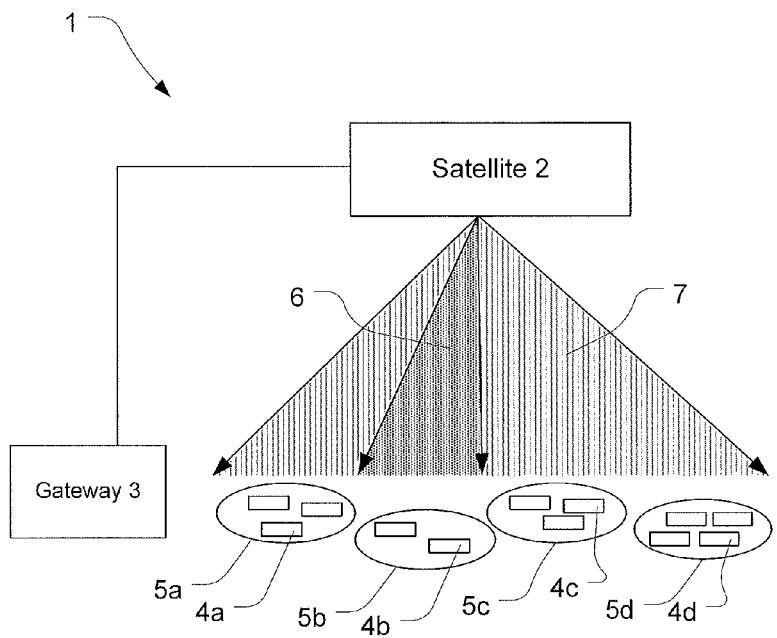
FIG. 1 is a schematic block diagram of a satellite broadcast system.

With reference to FIG. 1, a content broadcasting system 1 comprises a communication satellite 2, a gateway 3 and a plurality of user receiving devices 4a, 4b, 4c and 4d in a plurality of geographical areas or cells 5a, 5b, 5c and 5d. Each geographical area comprises more than one receiving device. The communication satellite 2 receives content from the gateway 3 on the ground via an uplink channel and broadcasts the content via a high power downlink beam 6 to the user receiving devices 4a, 4b, 4c and 4d located in different geographical areas 5a, 5b, 5c and 5d. The satellite broadcast signal is time divided between the multiple geographical areas based on a predetermined broadcast schedule. Different content may be transmitted to different areas. In some embodiments, only one geographical area 5a, 5b, 5c and 5d is illuminated at a time. In other embodiments, more than one geographical area is illuminated at the time. According to the invention, the communication satellite 2 also broadcasts a sustaining beam 7. According to some embodiments, the sustaining beam has a much lower power than the high power content beam. The sustaining beam is simultaneously broadcast over a wide region covering all of the geographical areas. By using the sustaining beam 7, the user receiving devices can remain synchronised and be ready to receive the high power content beam at very short notice as will be described in more detail below.

The content for transmission to the receiving devices 4a, 4b, 4c and 4d may be received by the gateway 3 from content providers (not shown) via terrestrial optical fibre links, terrestrial RF transmission or satellite links. The content received by the user receiving devices 4a, 4b, 4c and 4d may be displayed on receipt or stored for later display.

Figure 2:
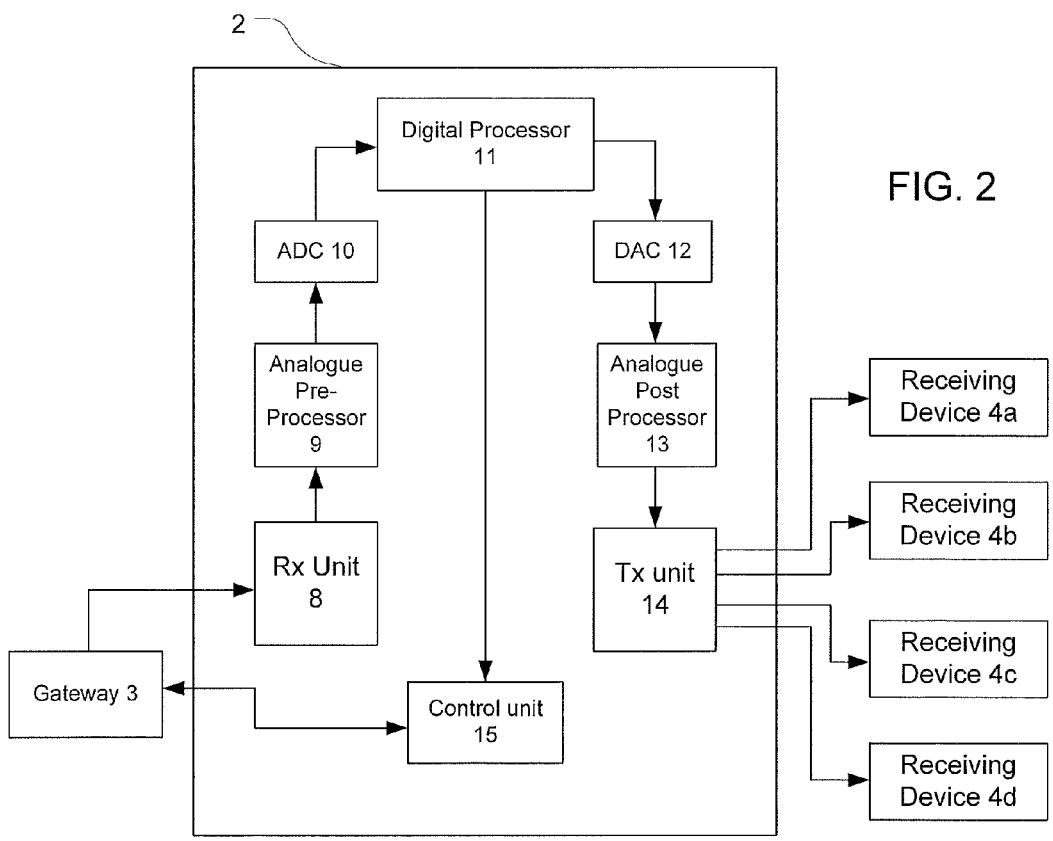
FIG. 2 is a schematic block diagram of the components of a communication satellite of the satellite broadcast system.

With reference to FIG. 2, the communication satellite 2 comprises a receive unit 8 for receiving and amplifying the signal in the uplink channel, an analogue pre-processor 9 for filtering and down-converting the signal, an analogue to digital converter (ADC) 10 for converting the signal into the digital domain, a digital processor 11 for processing the signal in the digital domain, a digital to analogue converter (DAC) 12 for converting the processed signal back into the analogue domain, a post-processor 13 for filtering and up-converting the processed signal and a transmission unit 14 for amplifying and transmitting beams to the receiving devices 4a to 4d. The communication satellite 2 also comprises a control unit 15 connected to the digital processor 11. The control unit 15 provides storage and an interface to the gateway 3 for allowing the digital processor 11 to be controlled from the gateway.

The receiving unit 8 may be arranged to receive signals from the gateway. The signals may be received and transmitted according to the digital video broadcasting satellite-to-handheld (DVB-SH) physical layer standard at frequencies of typically up to 3 GHz. The signals may be modulated according to the COFDM (Coded Orthogonal Frequency Division Multiplexing) and QPSK (Quadrature Phase Shift Keying) modulation techniques. Other modulation schemes, signal formats and frequencies can alternatively or additionally be used. Examples of other suitable standards include digital video broadcasting to handheld (DVB-SH) or European Telecommunications Standards Institute (ETSI) standard for digital radio (EDSR).

The transmission unit 14 may provide a multi-element antenna. In one embodiment, the digital processor 11 provides a beam forming network for splitting the uplink channel into a plurality of narrower frequency channels, translating the frequencies of the channels, routing the channels along a plurality of paths and setting the gain and phase within each path to the multi-element antenna of the transmission unit 14 such that a number of beams covering specific geographical areas can be formed. The high power content beam 6 and the sustaining beam 7 can be formed in this way. The content beam can be moved from one geographical area to another by adjusting the beam weights. For example, the control unit 15 may be used to receive and store data for controlling the transmission of the satellite downlinks according to a predetermined broadcast schedule. The control data can, for instance, comprise coefficients for use in applying the beam weights to produce the required beams and move the high power beam. Since beamforming networks are known, beamforming will not be described in further detail herein.

The high power content satellite beam 6 and sustaining satellite beams 7 can also be formed by an antenna with a single feed per beam in the transmission unit 14. One feed may be provided for each geographical location. However, such an antenna would provide reduced flexibility since it would be more difficult to reconfigure the satellite to transmit beams to new locations once the satellite is built and in orbit. The skilled person would realise that other types of suitable antenna configurations in the transmission unit 14, in addition to the ones described above, can also be used.

Figure 3:
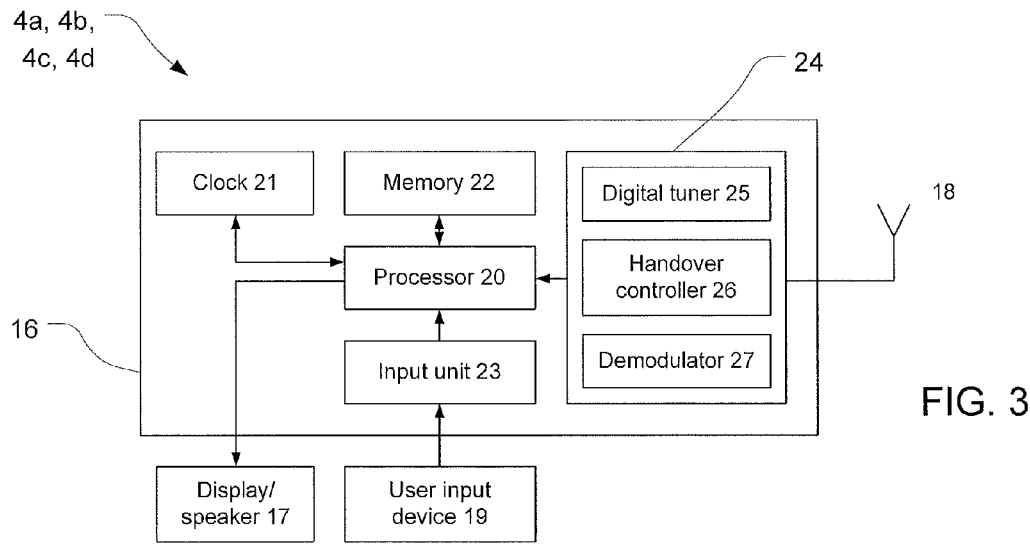
FIG. 3 is a schematic block diagram of the components of a receiving device of the satellite broadcast system.

With reference to FIG. 3, the receiving devices, 4a, 4b, 4c and 4d, may each be in the form of a set-top box 16 connected to a television receiver 17 with a display and speakers 17 and an antenna 18. A user input device 19, in the form of a remote control, may be provided to control the set top box 16 and the display and speakers 17. The antenna 18 may, for example, be a nominal 12 dBi Yagi-Uda antenna. The set-top box 16 itself may comprise a processor 20, a clock 21, a memory 22, an input unit 23 and a receiving circuit 24. The clock 21 is provided to synchronise with the communication satellite 2. The clock may, for example, synchronise with a clock synchronisation signal received at regular intervals from the communication satellite 2. The memory 22 may comprise both internal and external memory and store instructions and received content. The input unit 23 receives signals from the user input device 19 for controlling the set-top box 16 and the display/speakers 17. The input unit 23 and the user input device 19 may communicate with, for example, infrared signals as is well known in the art. The processor receives content from the receiving circuit 24 and stores the content in memory 22 and/or forwards the content to the display/speaker 17 for communication to a user.

The receiving circuit 24 is a module of the set-top box comprising a digital tuner 25, a handover controller 26 and a demodulator 27. The sustaining beam of FIG. 1 may be transmitted in a first frequency band comprising a first frequency whereas the high power content beam may be transmitted in a second frequency band comprising a second frequency. According to some embodiments, the tuner may be arranged to initially tune to the first frequency band. The content in the sustaining beam may be transmitted in bursts. In idle mode, between bursts, the tuner 26 may tune to the second frequency and monitor the signal strength on second frequency to check whether a signal is received. The tuner may monitor the signal strength on the second frequency automatically or in response to content in the sustaining beam signalling to the receiving device that the high power content beam 6 is due to be moved to the area in which the receiving device is located. If the signal strength on the second frequency is higher than a predetermined threshold, the handover controller 26 instructs the tuner 25 to switch to the second frequency band and receive the service in the second frequency band. In other words, the receiving device performs the handover to the high content beam when it has determined that the high power content beam is available in the area in which the receiving device is located. The frequency band of the sustaining signal 7 may be a much narrower frequency band than the frequency band of the high power content beam 6. The demodulator 27 extracts the content signal from the carrier on which it is sent and forwards the signal to the processor 20 for processing. In some embodiments, the handover controller 26 may check the identifying data of the demodulated signal to check that the stronger signal is a desired signal. The user may also control the tuner 25, using the user input device 19, to tune to different broadcast channels within the second frequency band if the second frequency band comprises more than one broadcast channel.

If the signal received on the second frequency is interrupted, the handover controller 26 will instruct the digital tuner to tune into the first frequency band and resume reception of the sustaining beam. This may be achieved in a similar way as the handover to the second frequency band. While receiving the high power content beam, the handover controller may monitor and compare the signal strength on the first frequency and the second frequency. When the signal strength on the second frequency is interrupted, the signal strength on the first frequency is found to be higher than the signal strength on the second frequency and the handover controller performs a handover back to the first frequency. Alternatively, it may only monitor the second frequency. When the signal strength on the second frequency goes below a certain threshold, the handover controller 26 may perform a handover back to the first frequency.

Although it has been described above that the receiving circuit monitors and the signal strengths of the two frequencies and makes the switch based on a comparison of the signal strengths of the two frequencies, this is just an example and the receiving device may not perform the monitoring and comparing step. Instead, the switch may be performed based on instructions in the sustaining beam 7 and the high power content beam 6. For example, the receiving circuit 24 may switch to the second frequency in response to signals in the sustaining beam signalling that the high power content beam 6 is due to be moved to the area in which the receiving device is located. Similarly, instructions to switch back to the sustaining beam are transmitted in the high power content beam 6. The instructions may specify which area the high power content beam is being redirected to next and at what time the high power content beam is being redirected. Information about where the high power content beam is being moved to may be transmitted to all the receiving devices or only to the receiving devices being affected by the move. In some embodiments, the decisions to execute the handover are based on a combination of signal strength comparison and information in the beams 6, 7.

By receiving the sustaining beam in the periods when the high power content beam is directed elsewhere, the set-top box remains synchronised with the communication satellite and can quickly adjust to reception of the service.

Handovers between different cells is known from DVB-H, DVB-SH A, DVB-SH B and ETSI technology. According to the DVB-H standard, a communication system comprising a receiving device moving from a first cell to a second cell can perform a handover such that the receiving device stops being serviced by a signal in the first cell and starts being serviced by a signal in the second cell when the signal strength from the second cell exceeds the signal strength from the signal in the first cell. According to one embodiment of the invention, this technology can be adapted for a stationary receiving device and a transmitter that is being turned on and off in the area of the receiving device.

Figure 4:
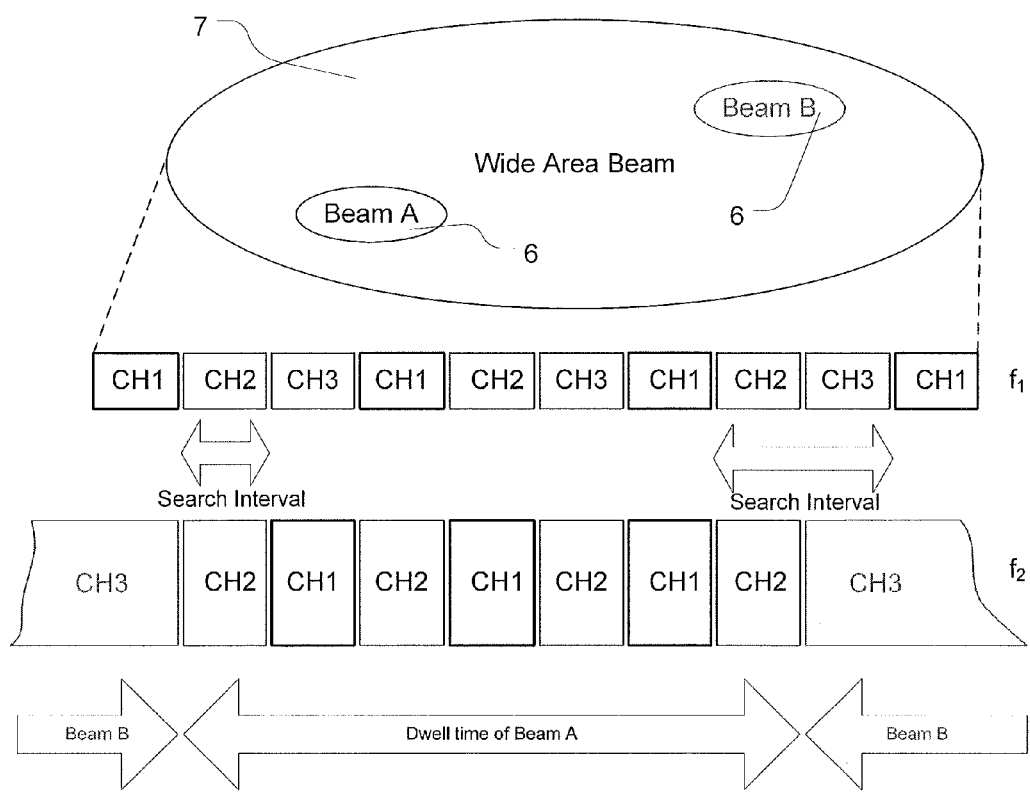
FIG. 4 schematically illustrate handovers between a sustaining beam and a high power content beam carrying a plurality of television channels.
Figure 5:
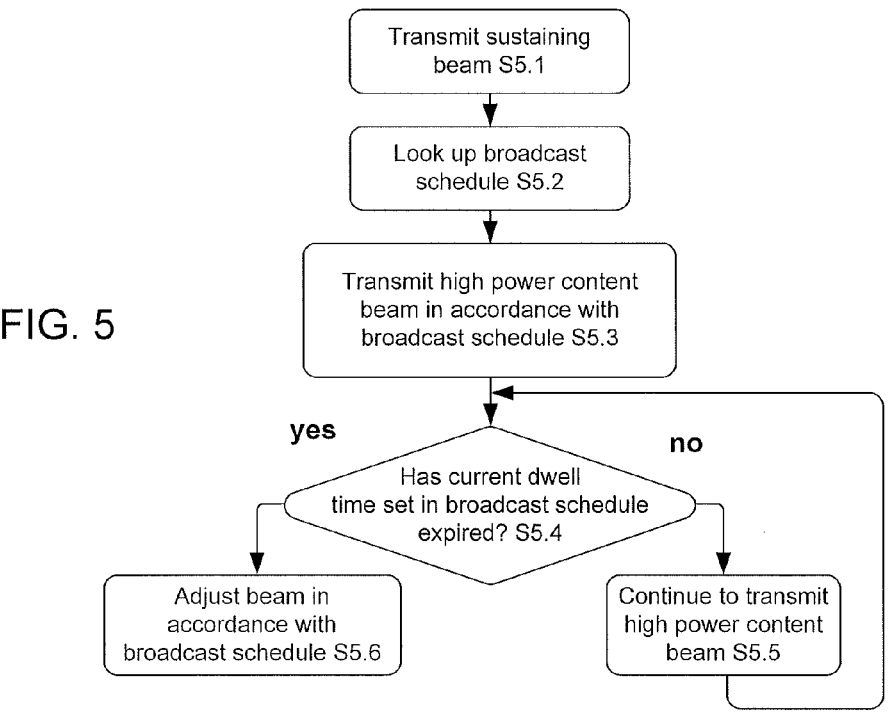
FIG. 5 illustrates a process for redirecting the high power content beam according to a broadcast schedule.

With reference to FIG. 4, it will now be described how the DVB-H, DVB-SH or ETSI technology can be adapted to be used in a satellite television broadcasting system with stationary receiving devices in accordance with one embodiment of the invention. The satellite 2 continuously transmits the sustaining beam 7 over a wide area. The satellite 2 also transmits the high power content beam to different locations at different times. FIG. 4 shows two spot-beams A, B within the wide area covered by the sustaining beam. The two spot-beams correspond to the high power content beam at different times. Referring back to FIG. 1, beam A may transmit to the first geographical area 5a and beam B may transmit to the second geographical area 5b. The spacecraft antenna gains for the wide area and the spot beams may be linearly related to their respective areas. In the simple system shown in FIG. 4, the broadcast system is programmed to transmit three different television channels, CH1 CH2 and CH3. The content of CH1 and CH2 are transmitted to the first geographical area whereas channel CH3 is transmitted to the second geographical area. The sustaining beam carries a limited sub-set of all services, for example an electronic programme guide and the channels are time-division multiplexed in the signals. The sustaining beam and the high power content beam are transmitted at different frequencies, $f_1$ and $f_2$. The user of the receiving device is tuned to channel 1, CH1. As shown in FIG. 4, the time intervals between the packets that make up channel 1, CH1, are used to search for other frequencies.

Towards the end of the dwell period within spot beam B over the second area 5*b*, the sustaining beam 7 signals to the receiving devices 4*a* in area 5*a* that area 5*a* is due to be illuminated by the high power content beam 6. The receiving devices 4*a* then uses the time interval between the portions of the data stream that makes up channel 1, CH1, to search for the high power content beam on frequency $f_2$ and lock to the beam at the appropriate time. The receiving device can then seamlessly continue to receive channel 1, CH1. Similarly, towards the end of the dwell time over area 5*a*, the receivers are instructed to switch back to the sustaining beam 7. The tuner again uses the interval between the different packets or portions of data of channel 1 to search for the sustaining beam on frequency $f_1$ and continues to receive packets of data for channel 1, although possibly with reduced content, through the sustaining beam.

The instructions in the sustaining beam and the high power content beam to perform a handover can be included in tables defined by the relevant standard. Using the DVB standards as an example, content may be streamed within IP packets rather than as raw MPEG streams within DVB packets so that the sophisticated signalling of IP datacast can be exploited. Receiving devices in a particular region can be assigned IP addresses within a given IP address sub-net. Signalling can thus be targeted to these geographical regions and their associated IP streams at the appropriate times. The IP/MAC Notification (INT) table and the Network Information Table (NIT), which forms part of the Program Specific Information/Service Information (PSI/SI) signalling tables associated with DVB-H, can be used to implement a handover protocol for performing the handovers. The INT table signals the availability and location of IP streams within a DVB-H network. The NIT table provides information relating to the physical organisation of multiplexes and transport streams within a DVB-H network. It provides a link to the INT table so that the receiver knows the location of a given IP stream.

Although the sustaining beam has been described above as carrying all available channels but with limited or no content, this is only an example. It may only cover one channel, but comprise the full content for that channel, or it may only carry a signalling channel. The sustaining beam may, for example, be a 24 hour news channel. The high power content beam may comprise a number of television channels. It may also comprise one or more radio channels. The number of channels included in the high power content beam depends on the specific requirements of the satellite broadcast system.

A broadcasting schedule and the operation of the communication satellite and the receiving devices will now be described with reference to FIGS. 5, 6, 7*a*, 7*b*, 7*c* and 7*d*. The sustaining beam is continuously transmitted to cover all of the four geographical areas, step 1 of FIG. 5 (S5.1), as shown in FIGS. 7*a*, 7*b*, 7*c* and 7*d*. The high power content beam is time divided between four geographical areas 5*a*, 5*b*, 5*c* and 5*d* according to a predetermined broadcast schedule. In FIG. 7*a*, the high power content beam is directed to cover a first geographical area. The digital processor may look up the broadcast schedule in the control data received in the control unit 15 from the gateway (S5.2), set the transmission unit 14 to direct the high power content beam to cover one of the geographical areas 5*a*, 5*b*, 5*c* and 5*d* in accordance with the broadcast schedule and then transmit the content beam (S5.3). The communication satellite illuminates the first geographical area for a dwell time set by the broadcast schedule. As long as the dwell time, set by the broadcast schedule, has not expired (S5.4), the high power content beam remains over the first geographical area 5*a* (S5.5). When the dwell time expires (S5.4), the transmission unit 14 is reconfigured to redirect the high power content beam in accordance with the broadcast schedule and the new beam is transmitted (S5.6) to a new region. When the transmission unit 14 comprises a multi-feed antenna and the digital processor 11 provides a beam forming network, the beam may be adjusted at step 5.6 by setting different beam weights for the different paths to the multi-feed antenna.

Figure 6:
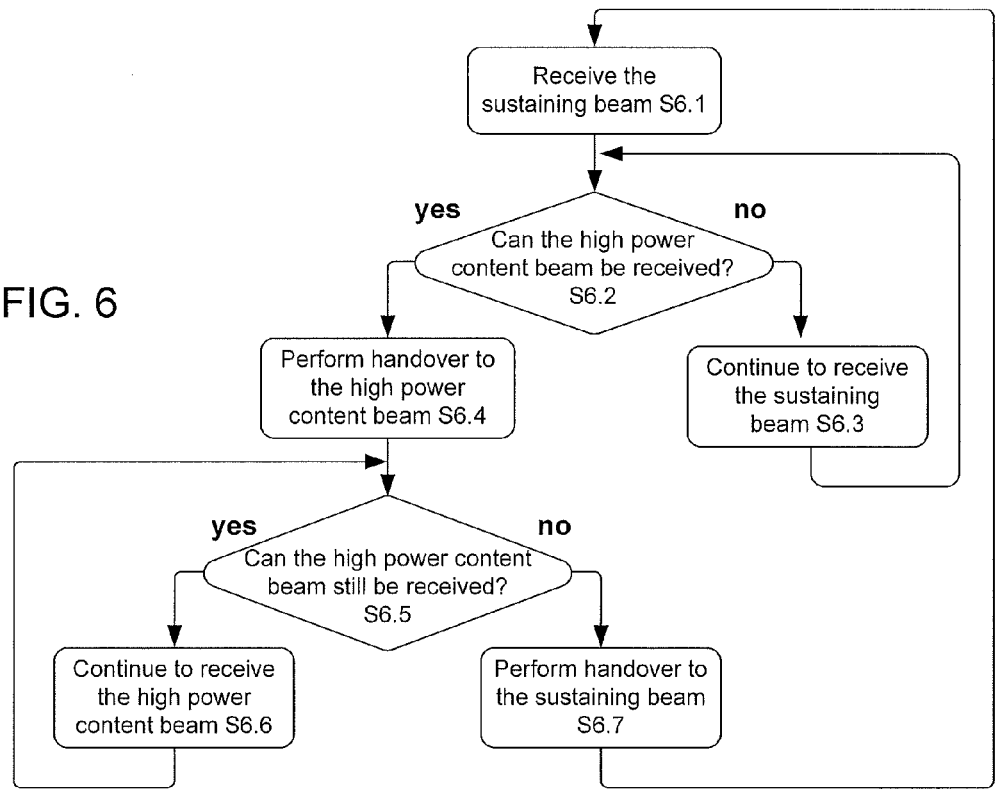
FIG. 6 illustrates a process of performing handovers between a sustaining beam and the high power content beam.
Figure 7:
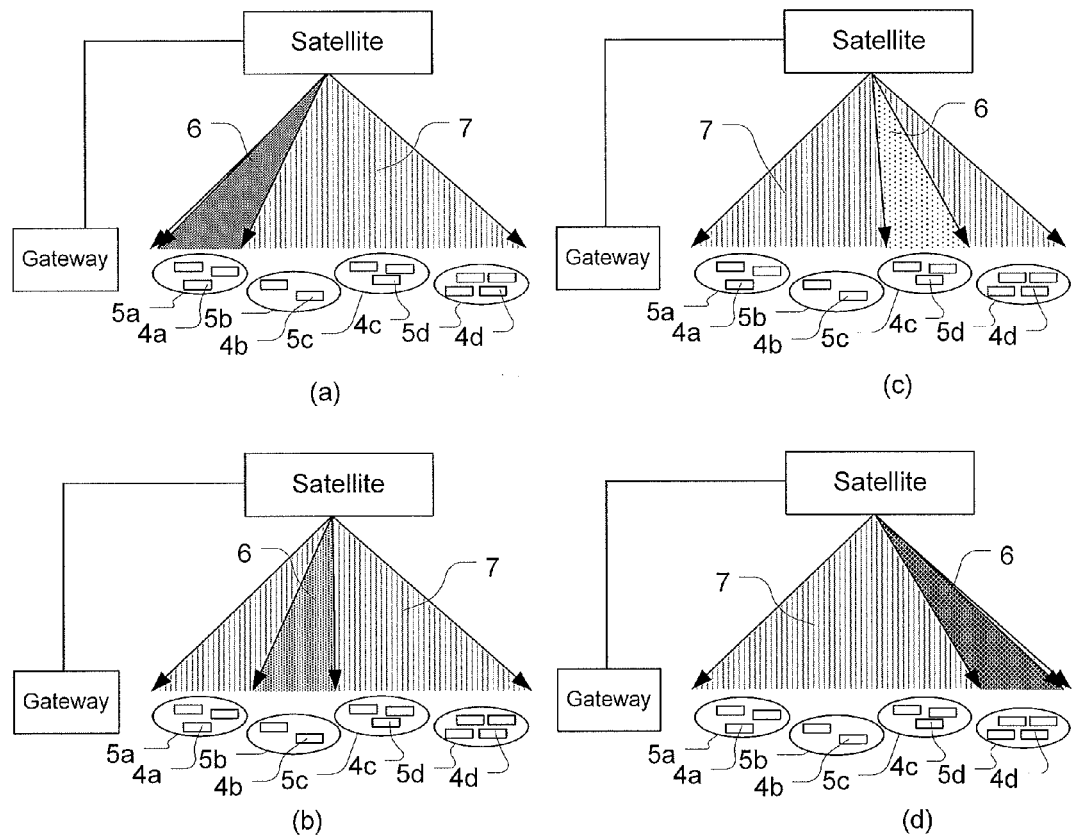
FIGS. 7a, 7b, 7c and 7d illustrate how a high power content beam can be located over different geographical areas.

With reference to FIG. 7*a* and FIG. 6, the receiving device 4*a* in a first geographical area 5*a* receives the high power content beam while the receiving devices 4*b*, 4*c* and 4*d* in a second, third and fourth geographical areas 5*b*, 5*c* and 5*d* receive the sustaining beam (S6.1). As long as the high power content beam cannot be received (S6.2), the receiving device continues to receive the sustaining beam (S6.3). When the high power content beam has moved to the second area 5*b*, as shown in FIG. 7*b*, and the receiving devices 4*b* in the second area 5*b* determines that the high power content beam can be received (S6.3), a handover is performed (S6.4) and the receiving devices 4*b* start receiving the high power content beam instead. As mentioned before, the receiving devices may be constantly monitoring the frequency at which the high power content beam is transmitted and when the signal power at that frequency is higher than a threshold, the handover controller 26 may instruct the tuner 25 to lock to the high power content beam. The signal structure determines when the high power content beam is monitored. Alternatively, or additionally, the handover may be performed in response to instructions sent through the sustaining beam 7. As long as the receiving devices 4*b* in the second geographical area can continue to receive the high power content beam (S6.5), the tuner 25 remains tuned to the frequency of the high power content beam (S6.6).

At some time later, the communication satellite 2 moves the high power content beam to a third geographical area 5*c*, as shown in FIG. 7*c*. At that stage, the handover controllers 26 in the receiving devices 4*b* in the second area 5*b* determine that they cannot receive the high power content beam any longer (S6.5) and switches to the sustaining beam (S6.7). Again, the handover can be performed in response to monitoring and comparing the signal strengths of the two beams or in response to instructions in the high power content beam. At this stage, the handover controllers 26 in the receiving devices 4*c* in the third area 5*b* determine that the high power content beam can be received in the third area 5*b* and instruct the tuner to lock to the high power content beam. After the dwell period allocated to the third geographical area, the communication satellite 2 moves the high power content beam to the fourth area 5*d*. The handover controller 26 in the receiving devices 4*c* in the third area instruct the digital tuners 25 in the receiving devices 4*c* to tune to the sustaining beam 7 whereas the handover controllers 26 in a receiving devices 4*d* in the fourth area 5*d* instruct the tuner in the receiving devices 4*d* in the fourth area 5*d* to tune to the high power content beam 6. The communication satellite 2 may then move the beam back to the first geographical area and the process may be repeated.

According to some embodiments, the communication satellite operates with a transmission cycle of 4 seconds. In the system shown in FIGS. 4*a*, 4*b*, 4*c* and 4*d*, with four separate cells, the "dwell" period in each cell may then be 1 second. This would result in 6 hours of content per day in each cell. In other embodiments, the dwell period is not the same for all the cells. For example, if the content required is less than 6 hours in some cells and more than 6 hours in other cells, the dwell period may be varied to provide different content density in each cell. For example, the cycle may still be 4 seconds, but the dwell period in the first and second cells 5a, 5b may only be 0.5 seconds while the dwell period in the third and fourth cells 5c, 5d is 1.5 seconds. Additionally, it is not necessary that all cells are illuminated in the cycle. For example, the cycle may be varied such that if less information is required in the third cell, the third cell is skipped every other cycle.

A receiving device that is configured to power up and synchronise with respect to the high power content beam before it can receive any content would typically take a few seconds to get ready to receive content. Consequently, it would be impossible for the receiving device to receive content according to a broadcasting schedule with dwell periods of only a few seconds or shorter. By using the sustaining beam, the receiving devices remain synchronised and can easily switch to the high power content beam. The receiving device is therefore able to receive the high power content beam instantaneously. As a result, very short broadcast intervals can be used. The content received in the high power content beam can be displayed to the user as it is received or stored in memory 22 for later display. The sustaining beam 7 may provide some content, for example a news channel as mentioned above, providing a non-time shifted or real-time service when the high power content beam 6 is directed elsewhere.

Moreover, if the receiving devices powered down when the high power content beam was interrupted, the receiving devices would have to operate according to a stored broadcasting schedule to know when to power up again. The broadcasting schedule would have to be sent to the set-top boxes at regular intervals and could not be changed at short notice. By providing a sustaining beam and handovers according to the invention, the receiving devices do not need to consult a broadcasting schedule. They can just switch to the frequency of the high power content beam when the high power content beam is determined to be available. This allows the broadcasting schedule to be altered at short notice.

Instructions for performing the processes described in FIGS. 4, 5, 6, 7a, 7b, 7c and 7d may be implemented as hardware, software or a combination of both in the digital processor 11 of the communication satellite 2 and the processor 20 and handover controller 26 in the receiving devices 4a, 4b, 4c and 4d.

Moreover, although it has been described that the handover controller can switch between the beams based on the signal strengths of the beams or instructions received in the beams or a combination of both, these are just examples and it is contemplated that the handover controller 26 can make the decision based on other information instead or as well. For example, the handover controller may be programmed to consider the frequency associated with the sustaining beam the default frequency. If the high power content beam is interrupted, the handover controller may be programmed to automatically switch back to the default frequency. Consequently, in an alternative embodiment, the handover controller need not monitor the signal strengths or the content received while receiving the high power content beam.

Furthermore, while, in the examples above, the receiving device is described to have one antenna and to be configured to search for other signals in time intervals defined by the multiplex of the beams, the receiving device may instead have a second antenna that receive the signal on the alternative frequency while the first antenna receive the signal on the first frequency.

It should also be realised that although four geographical areas have been shown, the cycle of the high power content beam could include any number of geographical areas. Also, although the sustaining beam has been described to simultaneously cover all the geographical areas between which the high power content beam hops, it is contemplated that the sustaining beam may only cover a portion of the geographical areas at a time. For example, the geographical areas may be divided into two groups. For part of the day, the high power content beam may 'hop' at a relatively high rate between the geographical areas in the first group and, for the rest of the day, the high power content beam may 'hop' between the geographical areas in the second group. The sustaining beam may move, at a much slower rate, between the first group of geographical areas during the first portion of the day and the second group of geographical areas during the rest of the day. The receiving devices in the first group of devices may power down while the beams are over the second group of devices and vice versa. The sustaining beam may be moved to cover the next group of receiving devices in time for the receiving devices to power up and synchronise with the sustaining beam before the high power content beam arrives. Consequently, the sustaining beam may also be redirected according to broadcast schedule.

Whilst specific examples of the invention have been described, the scope of the invention is defined by the appended claims and not limited to the examples. The invention could therefore be implemented in other ways, as would be appreciated by those skilled in the art.

For example, although only one gateway is described with respect to FIG. 1, it should be understood that more than one gateway may be used. The gateways may receive the same or different content. Moreover, the control unit does not have to receive control signals from a gateway passing on content. It can instead receive the control signals from a ground station separate from the gateway.

Moreover, in the main embodiment the satellite has been described to comprise a digital processor providing a beam forming network but it should be realised that this is just an example and the high power content beam and the sustaining beam can also be produced by other means. Additionally, although a COFDM signal and QPSK modulation were described as examples, other types of suitable multiplexing and modulation schemes may of course be used.

Furthermore, although the receiving device has been described as a set-top box connected to a separate display with speakers, the set-top box, display and speakers may be incorporated in a single device.

Additionally, the invention is not limited to television content but could be used to communicate any type of content that can be broadcast using a satellite broadcasting system. The display/speaker 17 is not limited to a television receiver but could be any apparatus suitable for receiving and reproducing the broadcast content. Any kind of content could be transmitted, including radio and data content. Additionally, the receiving device does not have to be a stationary receiver. It could also be a mobile receiver.

The invention claimed is:

1. A receiving device for receiving a satellite broadcast transmitted in a high power content beam from a communication satellite, the receiving device comprising:
a controller for determining whether the high power content beam can be received by the receiving device, wherein the controller is configured to perform a search for the high power content beam and determine whether the high power content beam can be received based on a determination that the signal strength associated with the high power content beam is higher than a threshold; and a receiver for receiving a sustaining satellite beam continuously transmitted to the geographical area of the receiver, the receiver arranged to tune the sustaining satellite beam in time periods when the high power content beam is not received, wherein the controller switches the receiver to receive the high power content satellite beam in response to determining that the high power content satellite beam can be received by the receiving device, and switches the receiver to use the sustaining satellite beam to remain synchronized with the communication satellite if it is determined that the high power content satellite beam cannot be received.

2. A receiving device according to claim 1, wherein the controller is configured to determine whether the high power content satellite beam can be received based on information in the sustaining satellite beam.

3. A receiving device according to claim 2, wherein the information is an indication of when the high power content beam will be moved to a region in which the receiving device is located.

4. A receiving device according to claim 1, wherein the controller is configured to search for the high power content beam in accordance with the signal structure of the sustaining beam.

5. A receiving device according to claim 1, wherein the controller is further configured to switch the receiver back to receiving the sustaining satellite beam in response to a determination that the high power content beam cannot be received by the receiving device.

6. A receiving device according to claim 1, wherein the transmission power of the sustaining beam is lower than the transmission power of the high power content beam.

7. A receiving device according to claim 1, wherein the controller is configured to perform a handover to the sustaining beam according to the DVB-H, DVB-SH A, DVB-SH B or ETSI standard in order to switch the receiver to receive the high power content satellite beam.

8. A receiving device according to claim 1, wherein high power content beam provides television content.

9. A set-top box for a television receiver comprising the receiving device of claim 1.

10. A set-top box according to claim 9, wherein the high power content beam comprises a plurality of time-division multiplexed television channels and the set-top box further comprises a memory for storing the received content in the television channels for time-shifted display to a user.

11. A method of receiving a satellite broadcast in a receiving device, the satellite broadcast transmitted in a high power content beam from a communication satellite, the method comprising:

determining whether the high power content beam can be received by the receiving device based on the signal strength of a signal at a frequency associated with the high power content beam;

receiving a sustaining beam continuously transmitted to the geographical area of the receiver; and performing a handover to a high power content beam from the sustaining beam in response to determining that the high power content beam can be received.

12. A method according to claim 11, further comprising:

in response to determining that the high power content beam cannot be received, resuming reception of the sustaining beam.

13. A method according to claim 11, further comprising:

determining that the high power content beam can be received based on an indication in the sustaining beam.

14. A method according to claim 11, wherein performing a handover comprises:

performing a handover according to the DVB-H, DVB-SH A, DVB-SH B or ETSI standard.

15. A receiving device according to claim 2, wherein the controller is configured to perform a search for the high power content beam and determine that the high power content beam can be received based on a determination that the signal strength associated with the high power content beam is higher than a threshold.

* * * * *